United States Patent [19]

Grancio et al.

[11] 3,965,230

[45] June 22, 1976

[54] PROCESS OF MANUFACTURING LACQUERED ARTICLES OF COLD ROLLED ABS RESIN

[75] Inventors: Michael R. Grancio, Hampden; George E. Walker, Longmeadow, both of Mass.

[73] Assignee: Monsanto Company, St. Louis, Mo.

[22] Filed: Jan. 27, 1975

[21] Appl. No.: 544,076

Related U.S. Application Data

[62] Division of Ser. No. 317,967, Dec. 26, 1972, Pat. No. 3,887,746.

[52] U.S. Cl. ............................... 264/129, 264/175
[51] Int. Cl.² ......................................... B29C 15/00
[58] Field of Search ........................... 264/129, 175

[56] References Cited
UNITED STATES PATENTS

| | | | |
|---|---|---|---|
| 2,668,134 | 2/1954 | Horton | 156/316 |
| 3,465,070 | 9/1969 | Smith | 264/175 |
| 3,582,456 | 6/1971 | Stolki | 428/215 |
| 3,586,594 | 6/1971 | Stolki | 428/215 X |
| 3,669,714 | 6/1972 | Wiley | 428/461 |
| 3,719,551 | 3/1973 | Radtke | 428/215 X |
| R27,404 | 6/1972 | Williams | 264/175 X |

*Primary Examiner*—Richard R. Kucia
*Attorney, Agent, or Firm*—Joseph S. Nelson; Edward P. Grattan; James C. Logomasini

[57] ABSTRACT

Ductile composite of a cold-rolled rubber reinforced resin sheet and a normally embrittling layer. The rubber reinforced resin in sheet form is cold rolled to reduce its thickness to between 95 and 40 percent of the original thickness. The cold rolled sheet may then be shaped by deep drawing. A protective or decorative layer which would normally impair the impact strength and toughness of unrolled resin is applied to the cold rolled sheet to yield a tough, impact resistant composite.

3 Claims, No Drawings

PROCESS OF MANUFACTURING LACQUERED ARTICLES OF COLD ROLLED ABS RESIN

This is a division of application Ser. No. 317,967, filed Dec. 26, 1972 now U.S. Pat. No. 3,887,746.

BACKGROUND OF THE INVENTION

1. Field of the Invention

This application relates to ductile composites of cold-rolled rubber reinforced resin sheets and normally embrittling layers.

2. Description

ABS resin comprises a dispersion of a butadiene rubber graft in a matrix of amorphous styrene acrylonitrile interpolymer. The resin can be molded and extruded in the fabrication of articles of manufacture. Molded or extruded sheets can be shaped or formed by the process of cold-drawing.

Articles manufactured from ABS resin may be coated to enhance their properties and their surface appearance. The coating may be a lacquer resin or an electroplated metal. The composite sheets thus obtained are embrittled because the layer deposited on the ABS is generally brittle so that under stress, cracks induced in the deposited layers are propagated into the ABS layer causing a reduction in physical properties particularly impact resistance.

Thus, there is a need for composite sheets of ABS resin and normally embrittling layers, such composite sheets being free of embrittlement and substantially retaining the impact resistance of ABS resin.

SUMMARY OF THE INVENTION

The present invention relates to articles of manufacture comprising a rubber reinforced resin substrate and a brittle superstrate, which exhibit high impact strength and freedom from brittleness.

More specifically, the present invention relates to articles manufactured from rubber reinforced resin in sheet form which is cold-rolled and then lacquered and to a process for production of articles of manufacture which comprises forming rubber reinforced resin into sheets, cold-rolling the sheets of resin to reduce the thickness of the sheet to between 95 and 40 percent of the original thickness of the sheet, and lacquering the shaped article by applying a solution of lacquer by the conventional processes of dipping, painting or spraying. Optionally prior to the lacquering step, the cold-rolled sheet of resin can be formed or shaped by the technique of cold-drawing.

Additionally, the present invention relates to articles manufactured from rubber reinforced resin in sheet form which is cold-rolled and then electroplated and to a process for production of articles of manufacture which comprises forming rubber reinforced resin into sheets, cold-rolling the sheets of resin to reduce the thickness of the sheet to between 95 and 40 percent of the original thickness of the sheet, and plating the shaped article by electroless plating followed by electrolytic plating.

DESCRIPTION OF THE PREFERRED EMBODIMENTS

In the practice of the invention amorphous rubber reinforced resins comprising a dispersion of rubber in a matrix of amorphous interpolymer are used. The rubber reinforced resins can contain between 3 and 30 percent by weight of a reinforcing rubber, such as for example polybutadiene, butadiene-styrene copolymers, isoprene, neoprene, nitrile rubbers, acrylate rubbers, natural rubbers, interpolymers of butadiene with acrylonitrile, methacrylonitrile, tertiary butyl styrene, styrene and mixtures thereof such as acrylonitrilebutadiene copolymers, methacrylonitrile-butadiene copolymers, acrylonitrile-styrene-butadiene terpolymers, methacrylonitrile-styrene-butadiene terpolymers, methacrylonitrile-tertiary butyl styrene-butadiene terpolymers, acrylonitrile-tertiary butyl styrene terpolymers, and ethylene-propylene-butadiene terpolymers.

The amorphous matrix comprises interpolymers of vinylidene aromatic hydrocarbons and ethylenically unsaturated nitriles. The vinylidene aromatic hydrocarbons include styrene and substituted styrenes, such as alpha-methyl styrene, vinyl toluene, alpha-chloro styrene, ortho-chloro styrene, meta-chloro styrene, para-chloro styrene, ortho-methyl styrene, para-methyl styrene, ethyl styrene, iso-propyl styrene, butyl styrene, ortho-, meta-, or para-tertiary-butyl styrene and dichloro-styrene. The ethylenically unsaturated nitriles include acrylonitrile, methacrylonitrile and ethacrylonitrile. The ratio of unsaturated aromatic hydrocarbon to ethylenically unsaturated nitrile is in the range of 5:95 to 95:5. From the standpoint of commercial practice, the preferable range is between 30:70 and 85:15.

The interpolymers can be prepared by any method well known to those skilled in the art e.g. by bulk, emulsion, solution or suspension polymerization methods.

The rubbery component can have a particle size in the range of 0.01 to 1.5 microns. The preferred particle size is in the range of 0.05 to 0.15 microns. The rubber is incorporated into the amorphous matrix by any of the methods which are well known to those skilled in the art e.g. by direct polymerization of monomers, polyblending, grafting, etc. Especially preferred are polyblends derived from mixing a graft copolymer of styrene and acrylonitrile superstrate on a substrate of polybutadiene or rubbery butadiene copolymer wherein the ratio of superstrate to substrate is in the range of from 10:100 to 250:100 parts by weight with an interpolymer of composition similar to the superstrate. These preferred polyblends are within the class of resins conventionally designated as ABS resins.

The compositional range of rubber reinforced resin includes resins which are normally brittle under forming conditions and thus not broadly cold formable and includes resins which are normally ductile and hence broadly cold-formable. As employed herein, "brittle" refers to materials which have a tensile elongation of less than 5 percent beyond the yield point or, in the case of materials having no yield point under tension, have less than 5 percent total elongation. The tensile elongation is measured on a "dog bone" sample specimen having an effective gauge length of 1 inch with 1.875 inches between the tensiometer grips. The sample is 0.25 inch wide and 50 to 150 mils thick. The test is carried out at room temperature and at about 50% relative humidity. The jaws are separated at a rate of 0.1 inch per minute.

As employed herein, the term "ductile" refers to material which will pass through a tensile yield point and will elongate by at least 5 percent of the original length beyond the yield point before fracture occurs. Rubber reinforced resin containing less than about 10 percent rubber will generally be brittle. Moreover, if the average particle size of the rubber is less than 0.2 micron, little reinforcing effect is obtained from the rubber so that an amorphous resin comprising rubber of such small particle size dispersed in an interpolymer matrix is generally brittle.

The amorphous rubber reinforced resin is formed into sheets by any of the conventional methods of extrusion or molding. The thickness of the sheets is in the range of 10 to 250 mil.

The sheets of amorphous rubber reinforced resin are subjected to the process of cold-rolling. In cold-rolling, the forming process takes place along the line of the rolls as the specimen is passed between the rolls. The technique can be applied in two ways; the first in which a sheet of material is rolled successively in one direction only (unidirectional) and the second in which a sheet is rolled successively with rotation of the specimen through 90° after each pass (cross-rolled). Where the term "cold" is employed herein it is intended to mean a temperature at least 20°C. below the glass transition temperature of the amorphous rubber reinforced resin upon which work is being done. The preferred temperature is ambient or room temperature to avoid heating and cooling steps which are time consuming and uneconomical with thick sheets of resin.

Cold-rolling is carried out by passing the sheet of amorphous rubber reinforced resin at a speed between 5 and 50 ft. per minute between cold rolls, set apart at between 90 to 99 percent of the sheet thickness. The distance between the rolls is adjusted after each pass. Rolling is continued until the sheet is reduced to between 95 and 40 percent of the original thickness.

Surprisingly although the amorphous reinforced resins containing 3 and 10 percent of reinforcing rubber or reinforced with rubber of small particle size only, in the range of 0.05 to 0.15 microns tend to be brittle and fail readily under tensile stress, they are malleable to compressive stresses of cold-rolling yielding cold rolled sheets which prove to be very ductile after cold-rolling so that they may then be deep drawn or cold formed under tensile stresses. This is advantageous since it is often the case that processes which yield small particle size rubbers are inherently more economical than the processes which yield large particle rubbers. A further economic advantage is obtained with ABS resins containing a relatively low concentration of reinforcing rubber which is the more expensive component of such resins, since they can be made to behave in cold drawing processes comparably to resins having a high concentration of rubber by means of the cold rolling process. Thus, after the sheet of amorphous rubber reinforced resin has been cold rolled it is optionally shaped or formed by deep drawing.

The cold rolled and optionally deep drawn specimen of amorphous rubber reinforced resin is coated by application of a normally embrittling layer of lacquer resin or electroplated metal. As employed herein, the term "normally embrittling layer" refers to a layer of material which when adhered to a ductile unrolled ABS resin sheet composition renders the composition brittle within the definition of that term as used herein.

Examples of embrittling lacquer resins include nitrocellulose, cellulose acetate, acrylic resins, non-drying alkyds, polyvinyl butyrals, polyvinyl formals, styrene-acrylonitrile copolymers. In general they are amorphous and do not possess a secondary glass transition.

The lacquer compositions may contain plasticizers, dyes and pigments in addition to the resin and are dispersed in conventional lacquer solvents. The formulated resin composition obtained after removal of solvent has a primary glass transition above 30°C. and preferably above 45°C.

The layer of lacquer resin is applied by any of the conventional techniques of dipping the amorphous rubber reinforced resin article in lacquer, or by brushing or spraying the lacquer on the surface of the amorphous rubber reinforced resin article, and allowing the article to dry under "cold" conditions within the definition of that term as used herein. The lacquer is applied to the ABS substrate to give a dried film thickness between 0.1 and 10 mils. The preferred film thickness is between 0.5 and 2 mils for adequate protection without excessive embrittlement.

Lacquering of the rubber reinforced amorphous resin serves one or more of the following purposes: improvement of the surface appearance, improvement of resistance to abrasion, improvement of resistance to ultraviolet radiation, and increase in impermeability to organic contaminants. These objects can also be achieved by laminating the ABS resin sheet with a film of protective resin. Lamination is carried out by conventional hot lamination techniques. The laminate is then subjected to cold rolling to reduce the thickness of the laminate to between 95 and 40 percent of the original thickness.

Electroplating of cold rolled rubber reinforced amorphous resin sheet is carried out by conventional techniques of electroless plating of copper followed by electrolytic plating. The thickness of the deposited metal layer is in the range of 0.1 to 10 mils and preferably 0.5 to 2 mils.

Coating of rubber reinforced resins of the ABS type with the embrittling layers disclosed herein usually yields embrittled composites even from inherently ductile resins so that articles shaped from the composites exhibit low impact resistance and shatter readily. It appears that stress cracking of the brittle resin film induced by tensile or compressive forces is propagated into the rubber reinforced resin substrate to cause failure of the substrate. However, by some mechanism which is not fully understood, the energy concentrated at the apex of the crack advancing through the lacquer film is dissipated at the surface of the cold rolled resin and propagation of the crack does not occur.

The following examples are given in illustration of the invention and are not to be construed as limitations thereof. All parts and percentages are by weight unless otherwise indicated.

The impact strength is measured by the Izod impact test. Test samples 3 inches by 0.5 inch containing a 22½° notch 0.1 inch deep are routed from the sheet of test material with a high speed router. The impact strength of lacquered samples is measured by dip coating the samples in lacquer, allowing them to dry for 24 hours at 25°C., then subjecting them to the Izod impact test. The thickness of the dry lacquer coating is 1.5 mil.

Particle size in the graft polyblends is determined by use of electron photomicrographic analysis of specimens stained with osmium oxide in accordance with the technique described by K. Kato in 9 Polymer 419,225 (1968).

The ABS polymer compositions of the examples are conventional compositions comprising a butadiene-acrylonitrile rubber containing a weight ratio of 93 parts butadiene to 7 parts acrylonitrile, and a styrene acrylonitrile interpolymer weight ratio of 70 to 30.

EXAMPLE 1

Part A — Control

An ABS polymer containing 18% rubber of 0.1 micron average particle size is compression molded to a sheet at 175°C. according to the following procedure. Pellets of the material are placed in a mold and the mold is placed between two platens of a hydraulic press and heated to 175°C. for a period of about 3 minutes. A ram pressure of 7000 psi is applied to the mold and held for two minutes. The platens are cooled with cooling water to room temperature and the mold is removed from the press. The sheet thus molded is then comminuted and the procedure is repeated. The product is a sheet of about 120 mils in thickness and 6 × 6 inches. A "dogbone" is routed from this sheet having a width of 0.25 inch and a thickness of about 120 mils. The test specimen is aged for 24 hours at 23°C. and 50% relative humidity and is then inserted into the jaws of an Instron tensile tester. The jaw grips are 1⅞ inches apart giving an effective gauge length of 1 inch. The cross-head speed of the tensile tester is 0.1 inch per minute. The sample passes through a yield point, elongates about 8% and then fails. This shows the material to be ductile within the definition of that term as used herein. The Izod impact strength is 4.5 ft.lbs./in. notch.

Part B — Cold-Rolled Sample

Part A is repeated up to the point of obtaining the 120 mils sheet. This sheet is run between the rolls of a Farrell high speed roll having 11 inch diameter rolls running at approximately 8 rpm on both rolls. The rolls are at approximately room temperature and are spaced apart at about 114 mils. (95% of the sample thickness). A second pass of the sample through the rolls is made, this time with the rolls spaced at 95% of the distance of the first pass and the sample is rotated 90°. This process is continued with sample rotation of 90° on alternating passes to provide uniform rolling along both axes of the material until the thickness is reduced to 60 mils. A dogbone is then routed from the material and tested as in Part A. This time the elongation after the yield point is found to be about 80%. The Izod impact strength is 14.0 ft.lbs./in. notch.

Part C — Unrolled Lacquered Composite

The procedure of Part A is carried out to the point of obtaining a 0.25 inch × 120 mil dogbone. The dogbone is then sprayed with a conventional nitrocellulose shoe heel lacquer. The dry coating thickness is 1.5 mil. The testing procedure described in Example 1, Part A (starting with aging at 24 hours at 23°C. and 50% RH) is then repeated. An elongation to fail of 1% is observed. Thus, the lacquer has embrittled the ABS within the definition of that term used herein. The Izod impact strength of a lacquered sample (coating thickness of 1.5 mil) is 3.0 ft.lbs./in. notch.

Part D — Rolled Lacquered Composite

The procedure of Part B is repeated to the point of obtaining a dogbone. The dogbone is then sprayed and tested in the manner described in Part C above. The elongation to fail is now 26%. This shows the cold rolled ABS-lacquer composite to remain ductile within the definition of that term used herein. The Izod impact strength of a lacquered sample (coating thickness 1.5 mil) is 12.2 ft.lbs./in notch.

This example shows that cold rolling of a rubber reinforced resin containing a high level of small particle size rubber, imparts a significant increase in ductility and impact strength and that while lacquering of unrolled resin sheet causes embrittlement, lacquering of the cold rolled sample has little effect. Indeed the ductility and impact strength are substantially greater than the ductility and impact strength of the unrolled unlacquered sample.

EXAMPLE 2

Part A — Control

A brittle ABS polymer containing 6.0% rubber 0.1 micron average particle size is compression molded to a sheet at 175°C. according to the following procedure. Pellets of the material are placed in a mold and the mold is placed between two platens of a hydraulic press and heated to 175°C. for a period of about 3 minutes. A ram pressure of 7000 psi is applied to the mold and held for two minutes. The platens are cooled with cooling water to room temperature and the mold is removed from the press. The sheet thus molded is then comminuted and the procedure is repeated. The product is a sheet of about 120 mils in thickness and 6 × 6 inches. A dogbone is routed from this sheet having a width of 0.25 inch and a thickness of about 120 mils. The test specimen is aged for 24 hours at 23°C. and 50% relative humidity and is then inserted into the jaws of an Instron tensile tester. The jaw grips are 1⅞ inches apart giving an effective gauge length of 1 inch. The cross-head speed of the tensile tester is 0.1 inch per minute. The sample passes through a yield point, elongates about 4% and then fails. This shows the material to be brittle within the definition of that term as used herein. The Izod impact strength is 0.5 ft.lb./in. notch.

Part B — Cold Rolled Sample

Part A is repeated up to the point of obtaining the 120 mils sheet. This sheet is run between the rolls of a Farrell high speed roll having 11 inch diameter rolls running at approximately 8 rpm on both rolls. The rolls are at approximately room temperature and are spaced apart at about 114 mils. (95% of the sample thickness). A second pass of the sample through the rolls is made, this time with the rolls spaced at 95% of the distance of the first pass. This process is continued until the sample is reduced to about 60 mils. A dogbone is then routed from the material and tested as in Part A. This time the elongation after the yield point is found to be about 50%. It should be noted that in this example rolling is carried out in one direction of the sample and the direction of the test is in the same direction. This shows approximately a tenfold improvement in elongation by the process of this invention. The elongation after the yield point of lacquered samples is less than 1 percent for the unrolled composition and more than 10 percent for the rolled composition.

EXAMPLE 3

Part A — Control

An ABS polymer containing 18% rubber of 0.6 micron average particle size is compression molded by the procedure set forth in Example 1A to yield a sheet of about 120 mils in thickness and 6 × 6 inches. The tensile elongation after the yield point and the impact strength are respectively 10 percent and 5.6 ft.lbs./in. notch.

Part B — Cold Rolled Sample

A cold rolled sheet of approximately 60 mils thickness is obtained from this ABS polymer by the process described in Example 1B. The tensile elongation beyond yield is 80%. The impact strength is 8.7 ft.lbs./in. notch.

Part C — Unrolled Lacquered Composite

Lacquered impact test samples are prepared by the procedure of Example 1C. The elongation after yield is less than 5 percent. The impact strength is 3.0 ft.lbs./in. notch.

Part D — Rolled Lacquered Composite

Lacquered impact test samples are prepared by the procedure of Example 1D. The elongation after yield is more than 20 percent. The impact strength is 7.1 ft.lbs./in. notch.

This example shows that a ductile rubber reinforced resin containing rubber of relatively large particle size is embrittled by lacquering and reduced in impact strength. However, cold rolling of the rubber reinforced resin prior to lacquering imparts ductility and impact resistance to the lacquered resin which is superior to the impact resistance of the unrolled unlacquered resin.

EXAMPLE 4

Part A — Control

A 6 × 6 inches × 60 mil sheet of the material used in Example 1 is prepared by the method of Example 1, Part A. A 4.0 inch diameter circle is punched out of the sheet. The circle is placed over a female cavity having an inside diameter of about 3.12 inches. A male member having an 0.60 inch clearance relative to the female cavity is brought in contact with the sample and force is applied to the male member in the direction of the female mold. It is found that the sample shatters and cannot be formed.

Part B

A 6 × 6 inch × 60 mil sheet of the material used in Example 1 is prepared by the process described in Example 1, Part B. Again, a 4.0 inch circle is punched from the sheet and placed over a female cavity as in Part A of the present example. This time the male member forces the sample into the female cavity thereby forming a 3 inch diameter cup. Impact test samples are routed from the cup and lacquered as in Example 1D. The impact strength is >10 ft.lbs./in. notch.

This example shows that cold rolled ABS resin can be deep drawn and lacquered and still retain adequate impact strength.

EXAMPLE 5

The procedures of Example 1 are repeated except that a polyvinyl formal lacquer is substituted for the nitrocellulose lacquer. The cold rolled lacquered sample had an elongation after yield in excess of 20 percent and an impact strength in excess of 5 ft.lbs./in. notch.

What is claimed is:

1. A process of manufacture of an impact resistant ductile composite of a rubber reinforced resin substrate and an embrittling lacquer superstrate which comprises the steps of:
   A. forming a sheet of rubber reinforced resin comprising a dispersion of a rubber graft copolymer in a matrix of interpolymer; wherein the rubber graft copolymer comprises a superstrate of an interpolymer of 5–95 parts by weight of a vinylidene aromatic hydrocarbon monomer and 95–5 parts by weight of a unsaturated nitrile monomer on a rubber substrate; wherein the weight ratio of superstrate to substrate is in the range of 10:100 to 250:100; wherein the matrix interpolymer is of the same composition as the superstrate; wherein the reinforcing rubber comprises between 3 and 30 weight percent of the total resin; and wherein the average particle size of the rubber substrate is in the range of 0.01 to 1.5 microns; said sheet having less than about 5 percent elongation beyond the yield point when coated with an embrittling layer of lacquer.
   B. cold rolling the sheet of rubber reinforced resin at a temperature at least about 20°C. below the glass transition temperature of said rubber reinforced resin by passing it successively between cold rolls to reduce the thickness of the sheet to between 95 and 40 percent of the original thickness; and
   C. applying lacquer to at least one side of the cold rolled sheet of reinforced resin to provide a layer of lacquer between 0.1 and 10 mils in thickness, said cold rolling and applying lacquer providing said composite having a minimum elongation beyond the yield point of at least about 5 percent of the original length.

2. The process of claim 1, in which additionally the cold rolled sheet of rubber reinforced resin is deep drawn to shape it prior to the lacquering step.

3. The process of claim 1, wherein the vinylidene aromatic hydrocarbon monomer is styrene or a substituted styrene selected from the group consisting of alpha-methyl styrene, vinyl toluene, alpha-chloro styrene, ortho-chloro styrene, meta-chloro styrene, para-chloro styrene, orthomethyl styrene, para-methyl styrene, ethyl styrene, isopropyl styrene, butyl styrene, ortho-, meta-, or para-tertiary butyl styrene and dichloro-styrene; the unsaturated nitrile monomer is selected from the group consisting of acrylonitrile, methacrylonitrile and ethacrylonitrile; and the rubber substrate is selected from the group consisting of polybutadiene, butadiene-styrene copolymers, isoprene, neoprene, nitrile rubbers, acrylate rubbers, natural rubbers, acrylonitrile-butadiene copolymers, methacrylonitrile-butadiene copolymers, acrylonitrile-styrene-butadiene terpolymers, methacrylonitrile-styrene-butadiene terpolymers, methacrylonitrile-tertiary butyl styrene-butadiene terpolymers and ethylene-propylene-butadiene terpolymers.

* * * * *